US006625343B2

(12) United States Patent
Kato

(10) Patent No.: US 6,625,343 B2
(45) Date of Patent: Sep. 23, 2003

(54) OPTICAL SWITCH

(75) Inventor: Yoshichika Kato, Tokyo (JP)

(73) Assignee: Japan Aviation Electronics Industry Limited, Tokyo (JP)

(*) Notice: Subject to any disclaimer, the term of this patent is extended or adjusted under 35 U.S.C. 154(b) by 188 days.

(21) Appl. No.: 09/944,354

(22) Filed: Aug. 30, 2001

(65) Prior Publication Data

US 2002/0028036 A1 Mar. 7, 2002

(30) Foreign Application Priority Data

Sep. 6, 2000 (JP) ........................ 2000-270621

(51) Int. Cl.[7] ................................................ G02B 6/26
(52) U.S. Cl. ............................................... 385/18
(58) Field of Search ............................ 385/16, 18–22; 359/224

(56) References Cited

U.S. PATENT DOCUMENTS

| 5,594,820 A | | 1/1997 | Garel-Jones et al. | |
|---|---|---|---|---|
| 6,064,505 A | * | 5/2000 | Blanding | 359/224 |
| 6,275,624 B1 | * | 8/2001 | Seddon | 385/16 |

FOREIGN PATENT DOCUMENTS

| EP | 0219358 | 4/1987 |
|---|---|---|
| EP | 0452012 | 10/1991 |
| EP | 1033601 | 9/2000 |
| JP | 3215812 | 9/1991 |

OTHER PUBLICATIONS

Bysel, R., et al., "Integration of Deformable Mirror Devices with optical fibers and waveguides," Integrated Optics and Microstructures; Sep. 8, 1992, vol. 1793, pp. 34–39.

* cited by examiner

*Primary Examiner*—Khiem Nguyen
(74) *Attorney, Agent, or Firm*—David N. Lathrop, Esq.; Gallagher & Lathrop

(57) ABSTRACT

In an optical switch which has a stationary electrode plate 23, a substrate 10, a movable electrode plate 20 formed integral with the substrate 10 through flexure portions 21, and mirrors formed on the top of the movable electrode plate 20 and which performs switching control of light by electrostatic driving of the movable electrode plate 20, an output optical fiber 334 and an input optical fiber 35 are arranged along two parallel straight lines, respectively, and mirrors 41 and 42 are formed on the movable electrode plate 20 in opposing relation to the output optical fiber 34 and the input optical fiber 35, respectively.

14 Claims, 16 Drawing Sheets

STEP 1

STEP 2

STEP 3

STEP 4

STEP 5

STEP 6

FIG. 6A STEP 7
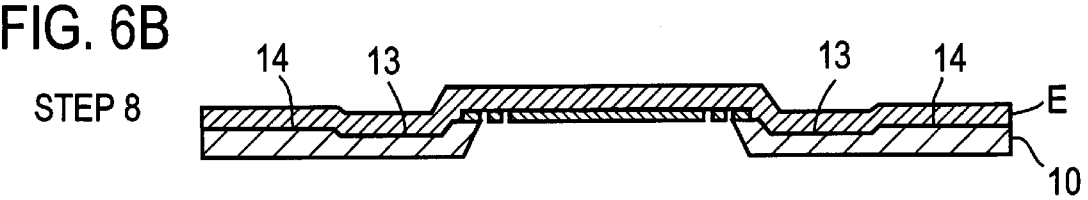
FIG. 6B STEP 8
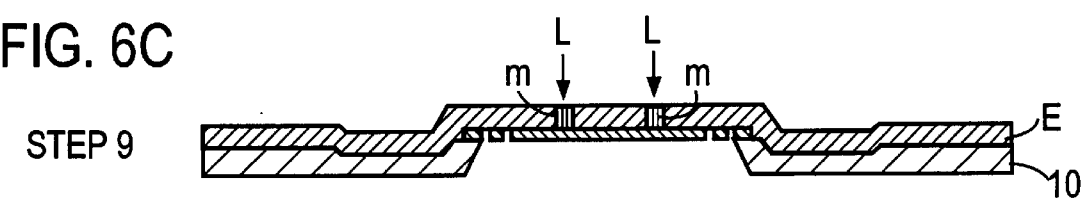
FIG. 6C STEP 9
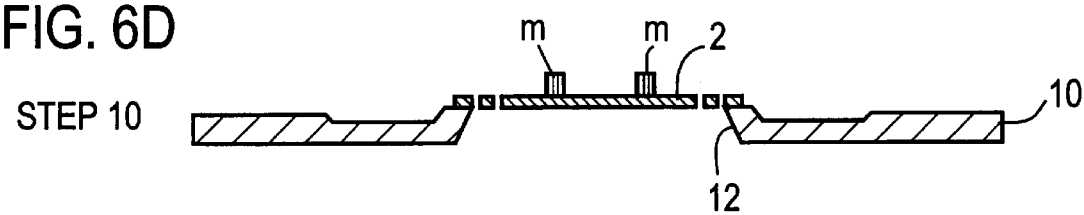
FIG. 6D STEP 10
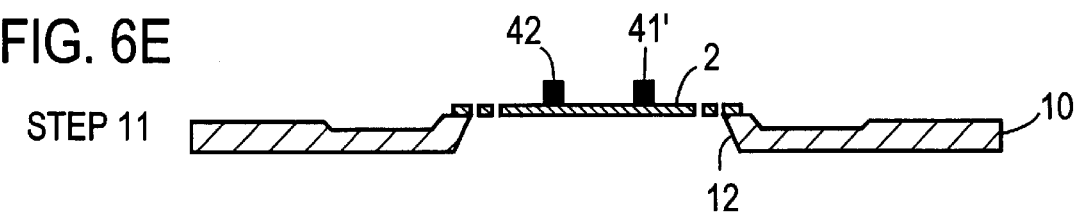
FIG. 6E STEP 11

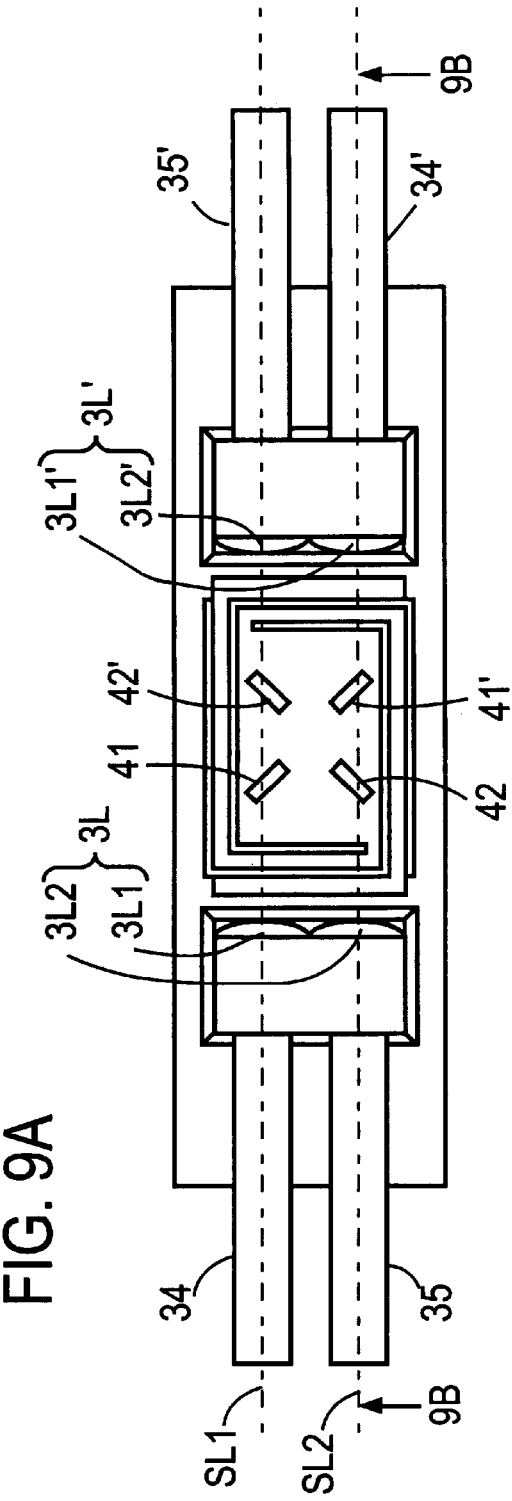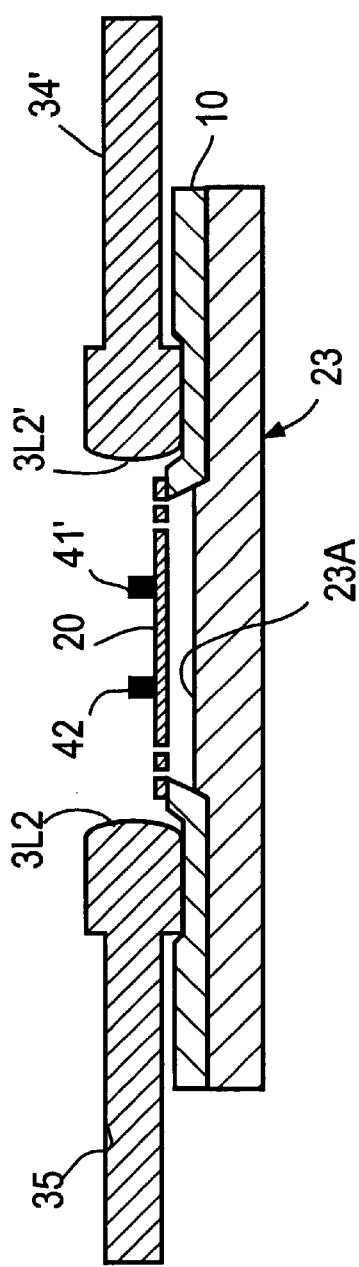
FIG. 9A
FIG. 9B

OPTICAL SWITCH

BACKGROUND OF THE INVENTION

The present invention relates to an optical switch and, more particularly, to an optical switch of the type wherein a mirror upstanding on a movable electrode plate is brought out of and into the optical path between opposed end faces of output and input optical fibers by electrostatic driving of the movable electrode plate to perform an ON-OFF operation.

A conventional optical switch will be described below with reference to FIGS. 1A and 1B. FIG. 1A is a top plan view of the optical switch and FIG. 1B a sectional view taken along the line 1B—1B in FIG. 1A.

Reference numeral 20 denotes a movable electrode plate 20 integrally formed with a silicon (Si) substrate through frame-shaped flexure portions 21, and 41 denotes a mirror formed on the top of the movable electrode plate 20. The movable electrode plate 20, the flexure portions 21 and the substrate 10 are formed as an integral whole by subjecting a rectangular starting silicon substrate to thin-film forming, photolithographic and etching process steps. Reference numeral 10a denotes a hole formed through the substrate 10. A brief description will be given of how to manufacture the conventional optical switch. The manufacture begins with the preparation of the substrate 10 whose thickness is hundreds of micrometers. The next step is to form a movable electrode plate (20) formation area in middle of the substrate surface and flexure part (21) formation areas on both sides thereof through application of thin-film forming, photolithographic and etching techniques to the top surface of the substrate 10, followed by forming the mirror 41 in the movable electrode plate (20) formation area through photolithography and etching, and then by selectively etching away the substrate 10 from underneath to form the through hole 10a, providing the movable electrode plate 20 and the flexure portions 21.

Following this, a stationary electrode plate 23 is attached to the underside of the substrate 10 over the through hole 10a in opposing relation to the movable electrode plate 20. A voltage is applied across the movable and stationary electrode plates 20 and 23 to generate electrostatic force, by which the movable electrode plate 20 is driven toward the stationary electrode plate 23.

Now, a description will be given of spatial optical path switching by the above optical switch. FIGS. 1A and 1B show that light transmitted through an output optical fiber 34 and emitted from its emitting end face is reflected by the mirror 41 and impinges on an input optical fiber 35 as indicated by $L_R$. This state will hereinafter be referred to as a steady state. With voltage application across the movable and stationary electrode plates 20 and 23, electrostatic force is generated to attract the both electrodes toward each other, by which the movable electrode 20 is driven and hence displaced downward with the flexure portions 21 deformed accordingly. With the downward displacement of the movable electrode plate 20, the mirror 41 formed on the top of the movable electrode plate 20 is also displaced downward and brought out of the optical path of the light beam emitted from the output optical fiber 34. As a result, the light beam emitted from the optical fiber 34 travels in a straight line and directly impinges on an input optical fiber 35' as indicated by $L_S$.

The optical switch depicted in FIGS. 1A and 1B is provided with one output optical fiber 34 and two input optical fibers 35 and 35', and the incidence of light on the both input optical fibers is controlled reversely relative to each other; that is, when the emitted light beam is incident on the one input optical fiber, no light beam is incident on the other, whereas when the light is incident on the latter, no light is incident on the former.

FIGS. 2A to 2D depict operations of a 2-by-2 optical switch of the type having two output optical fibers 34, 34' and two input optical fibers 35, 35'. The light beam emitted from the output optical fiber 34 is, in the steady state shown in FIGS. 2A and 2B, reflected by the mirror 41 on the movable electrode plate 20 and is incident on the input optical fiber 35. On the other hand, a light beam emitted from the output optical fiber 34' is, in the steady state of FIGS. 2A and 2B, reflected by the mirror 41 and is incident on the input optical fiber 35'.

In a driven state shown in FIGS. 2C and 2D in which a voltage is applied across the movable and stationary electrode plates 20 and 23 to attract the movable electrode plate 20 toward the stationary electrode plate 23, the light beam emitted from the output optical fiber 34 travels in a straight line over the mirror 41 and impinges on the input optical fiber 35' but does not strike on the other input optical fiber 35. On the other hand, the light beam emitted from the output optical fiber 34' travels in a straight line over the mirror 41 and impinges on the input optical fiber 35 but does not strike on the other input optical fiber 35'.

In the above prior art examples there is formed on the movable electrode plate 20 only one mirror 41 which reflects or does not reflect incident light beams. Incidentally, since the mirror 41 has a certain thickness, perfect coincidence of the optical axes of incident and reflected light beans is impossible as described below with respect to FIGS. 3A and 3B. FIG. 3A shows that the light beam emitted from the output optical fiber 34 is reflected by the one surface of the mirror 41 for incidence on the input optical fiber 35 or travels in a straight line over the mirror 41 for incidence on the input optical fiber 35'. In this state, if the optical axis of the optical fiber 34' is adjusted for coincidence or alignment between the optical axis of the light beam emitted from the output optical fiber 34' and traveling in a straight line over the mirror 41 and the optical axis of the input optical fiber 35, the optical axis of the light beam emitted from the output optical fiber 34' and reflected by the other surface of the mirror is displaced out of alignment with the optical axis of the input optical fiber 35'.

Referring next to FIG. 3B, in the illustrated state in which the optical axes of the input optical fibers 35 and 35' are aligned with the optical axes of the reflected and the straight-line traveling versions of the light beam emitted from the output optical fiber 34, if the optical axis of the optical fiber 34' is adjusted for coincidence or alignment between the optical axis of the light beam emitted from the output optical fiber 34' and reflected by the other surface of the mirror 41 and the optical axis of the input optical fiber 35', the optical axis of the light beam emitted from the optical fiber 34' and traveling in a straight line over the mirror 41 for incidence on the optical fiber 35 is displaced out of alignment with the optical axis of the input optical fiber 35 as shown.

Thus, the use of only one mirror 41 formed on the movable electrode plate 20 permits implementation of the 1-by-2 optical switch as depicted in FIGS. 1A and 1B, but such a single-mirror structure cannot be applied to the 2-by-2 optical switch because of the displacement of optical axes as referred to above with reference to FIGS. 2A to 2D or FIGS. 3A and 3D. In general, the incidence of light on one mirror from two optical fibers along optical axes crossing at right angles gives rise to the problem of misalignments of optical axes as depicted in FIGS. 3A and 3B. This problem arises also in the case of using, in combination, configurations that enable plural optical beams to impinge on each mirror.

Further, since the thickness of the mirror 41, the accuracy of the position of the mirror 41 on the movable electrode plate 20 and the accuracy of the angle of the mirror surface all exert influence on the axial alignment of the reflected light, it is not easy to achieve accurate axial alignment between the mirror 41 and the output optical fibers 34, 34' and the input optical fibers 35, 35'.

SUMMARY OF THE INVENTION

It is therefore an object of the present invention to provide an optical switch that is free from the above-mentioned problem of misalignment between optical axes and has mirrors so arranged as to facilitate alignment between them and input optical fibers.

The optical switch according to the present invention comprises:

- a substrate;
- a stationary electrode plate provided on said substrate in parallel relation thereto;
- a movable electrode plate mounted on said substrate through flexure portions and in space parallel relation to said stationary electrode plate so that said movable electrode plate moves toward or away from said stationary electrode plate;
- a first optical fiber having an optical axis on a first straight line passing across said movable electrode plate in parallel relation to said substrate and having its first light beam emitting tip end portion fixed to said substrate;
- a second optical fiber having an optical axis on a second straight line passing across said movable electrode plate in parallel relation to said first straight line and having its tip end portion fixed to said substrate;
- a first mirror formed on said movable electrode plate, for reflecting said first light beam emitted from said first optical fiber to a direction across said second straight line; and
- a second mirror formed on said movable electrode plate, for reflecting said reflected light beam from said first mirror as a second light beam along said second straight line for incidence on the end face of said tip end portion of said second optical fiber fixed to said substrate;
- wherein said movable electrode plate moves toward or away from said stationary electrode plate in response to the application of a voltage across said movable electrode plate and said stationary electrode plate or removal of said voltage from between said movable and stationary electrode plates by which said first and second mirrors are brought out of or into the paths of said first light beam and said reflected light beam from said first mirror.

BRIEF DESCRIPTION OF THE DRAWINGS

FIG. 6A is a diagram showing step 7 in the manufacture of the optical switch of the present invention;

FIG. 6B is a diagram showing step 8 in the manufacture of the optical switch of the present invention;

FIG. 6C is a diagram showing step 9 in the manufacture of the optical switch of the present invention;

FIG. 6D is a diagram showing step 10 in the manufacture of the optical switch of the present invention;

FIG. 6E is a diagram showing step 11 in the manufacture of the optical switch of the present invention;

FIG. 9A is a plan view illustrating an embodiment of the optical switch according to the present invention;

FIG. 9B is a sectional view taken along the line 9B—9B in FIG. 9A;

DETAILED DESCRIPTION OF THE PREFERRED EMBODIMENTS

With reference to the accompanying drawings, embodiments of the present invention will hereinafter be described.

Figure 1A:
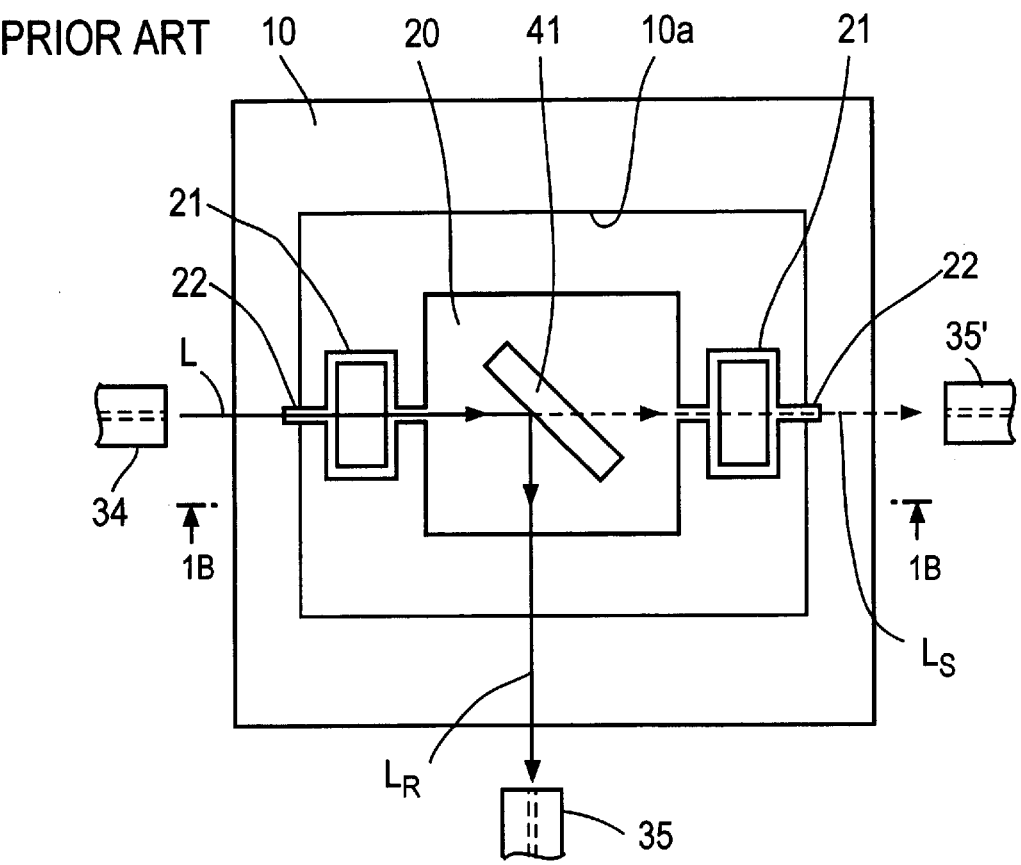
FIG. 1A is a plan view showing a conventional optical switch.
Figure 1B:
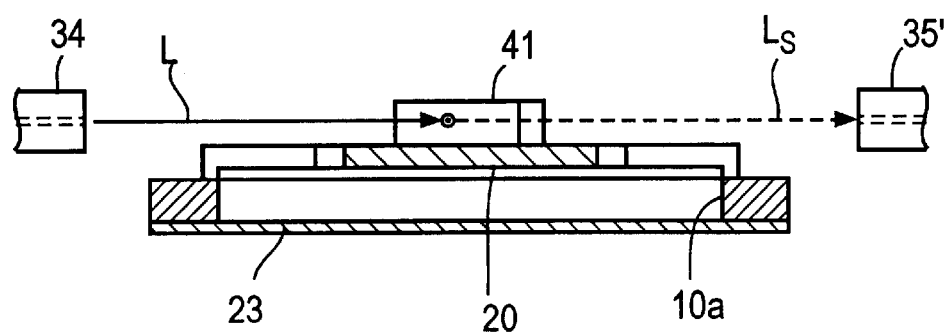
FIG. 1B is a sectional view taken along the line 1B—1B in FIG. 1A.
Figure 2A:
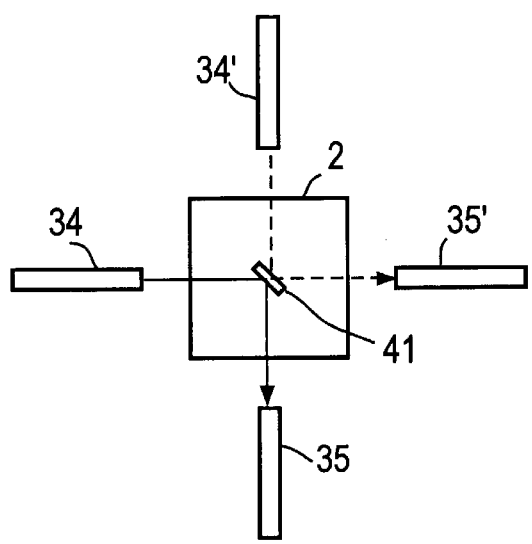
FIG. 2A is a diagram for explaining the operation of another conventional optical switch when a mirror is held in the optical path of incident light.
Figure 2B:
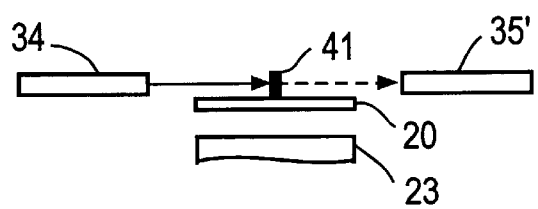
FIG. 2B is a side view of FIG. 2A.
Figure 2C:
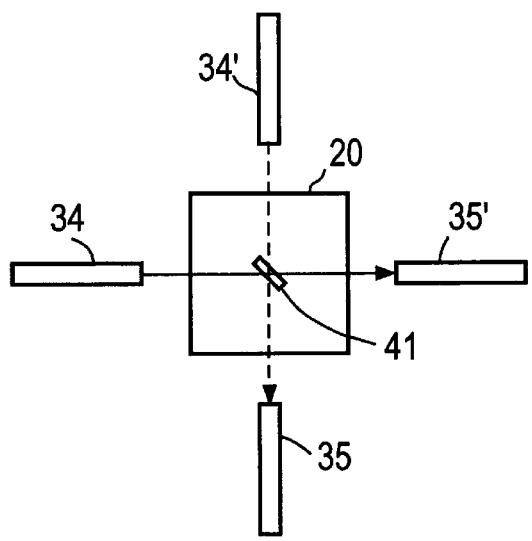
FIG. 2C is a diagram for explaining the operation of the optical switch when a mirror is held out of the optical path of the incident light.
Figure 2D:
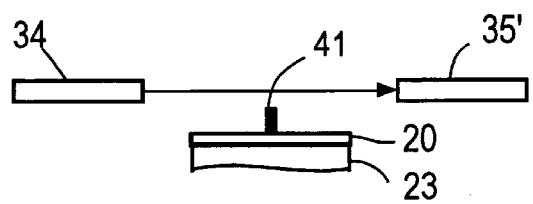
FIG. 2D is a side view of FIG. 2C.
Figure 3A:
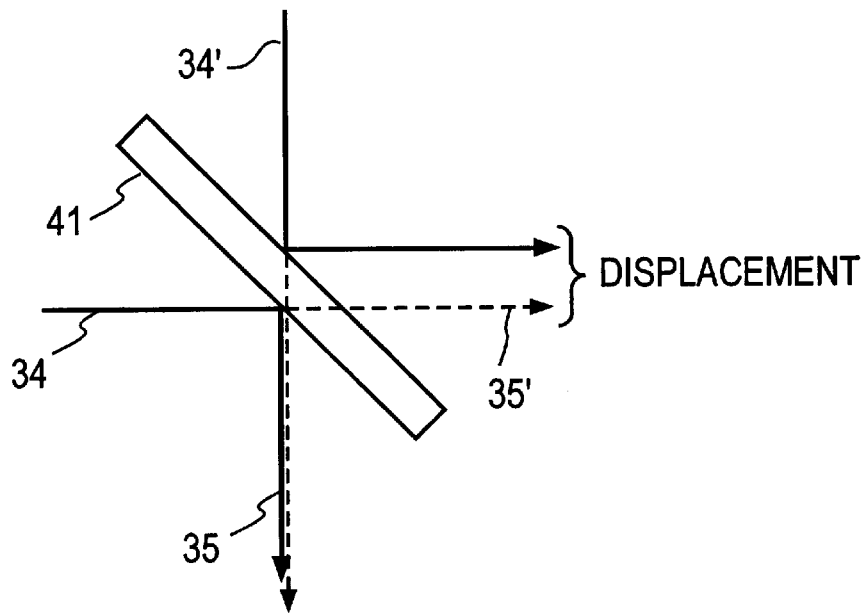
FIG. 3A is a diagram for explaining an example of displacement of the optical axis of the incident light by the mirror.
Figure 3B:
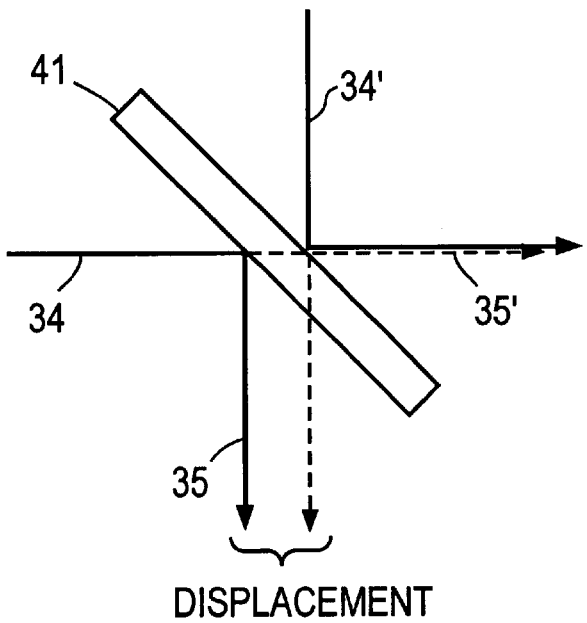
FIG. 3B is a diagram for explaining another example of displacement of the optical axis of the incident light by the mirror.
Figure 4A:
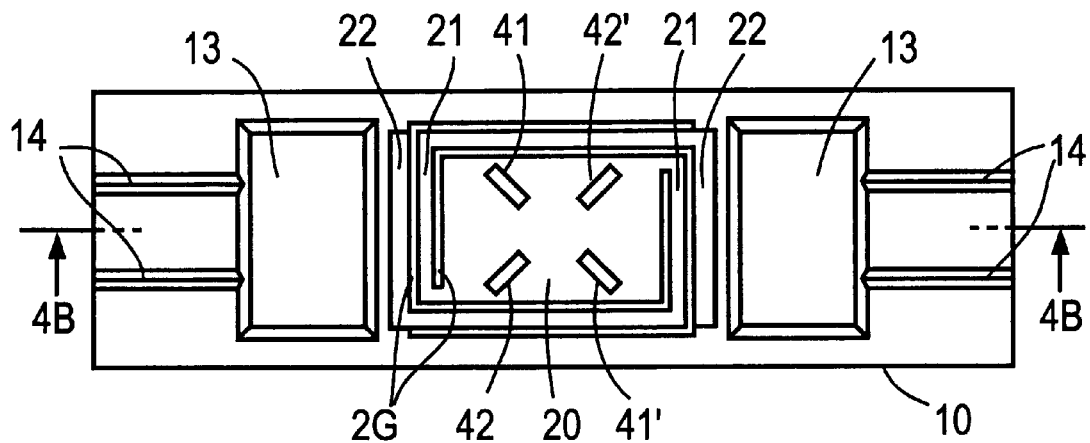
FIG. 4A is a plan view for explaining the substrate and the movable electrode plate in the optical switch of the present invention.
Figure 4B:
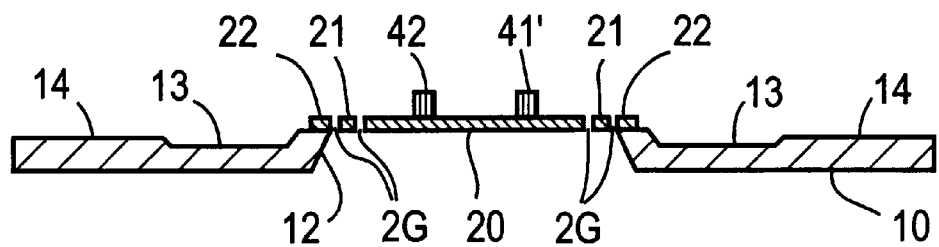
FIG. 4B is a sectional view taken along the line 4B—4B in FIG. 4A.
Figure 5A:
FIG. 5A is a diagram showing step 1 in the manufacture of the optical switch of the present invention.
Figure 5B:
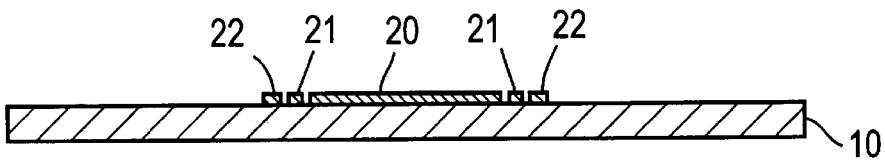
FIG. 5B is a diagram showing step 2 in the manufacture of the optical switch of the present invention.
Figure 5C:
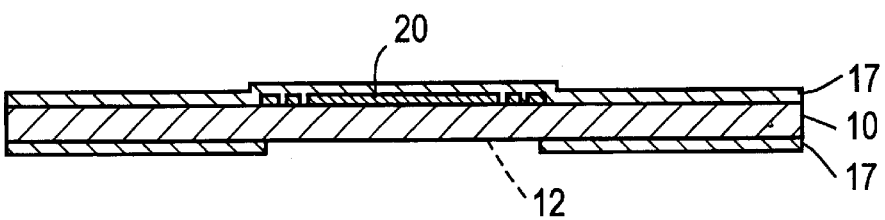
FIG. 5C is a diagram showing step 3 in the manufacture of the optical switch of the present invention.
Figure 5D:
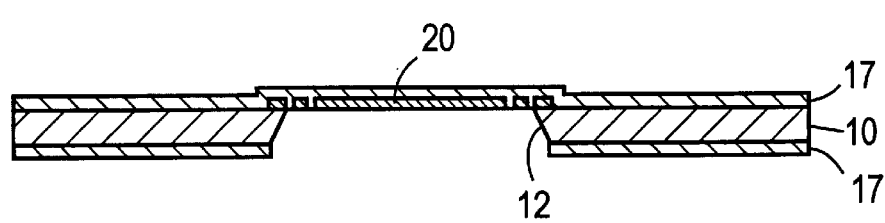
FIG. 5D is a diagram showing step 4 in the manufacture of the optical switch of the present invention.
Figure 5E:
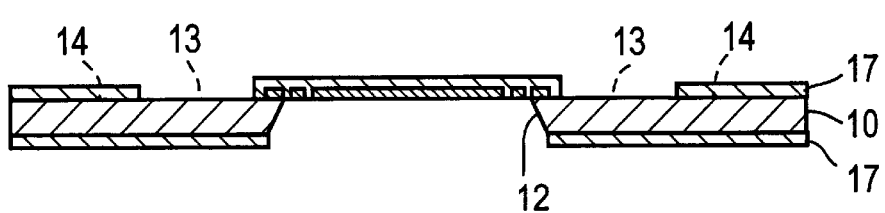
FIG. 5E is a diagram showing step 5 in the manufacture of the optical switch of the present invention.
Figure 5F:
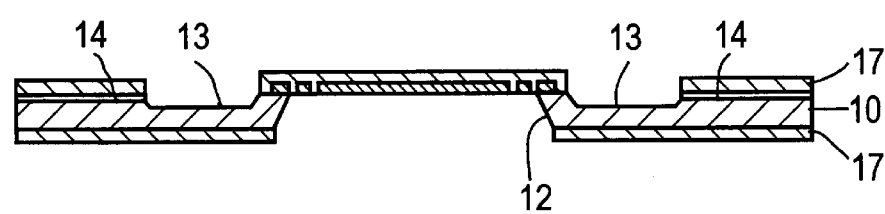
FIG. 5F is a diagram showing step 6 in the manufacture of the optical switch of the present invention.

FIGS. 4A and 4B are explanatory of a movable electrode plate 20 and mirrors 41, 42, 41' and 42' formed integrally with a substrate. In the top surface of a rectangular substrate 10 there are cut two pairs of fiber positioning V grooves 14 of a predetermined length which extend from opposite ends of the substrate 10 in parallel to its longer sides. The rectangular substrate 10 has centrally thereof a rectangular through hole 12 and has shallow recesses 13 formed in the substrate surface between both sides of the through hole 12 and the inner ends of the V grooves 14. The recesses 13 serves as clearances between microlenses attached to inner end faces of optical fibers disposed in the V grooves 14 and the substrate 10.

The movable electrode plate 20 is disposed on the substrate surface side centrally of the through hole 12 and is formed integral with the substrate 10 through flexure portions 21 and coupling portions 22. The flexure portions 21 in this example are L-shaped portions that extend clockwise from two opposite angles of the rectangular movable electrode plate 20 along its shorter and then longer sides, and their end portions further extend along the marginal portions of the of the substrate 10 adjacent the through hole 12 to form the coupling portions 22. The substrate 10, the flexure portions 21 and the coupling portions 22 are formed through application of thin-film forming, photolithographic and etching techniques to a starting silicon substrate. The hole 12 is formed through the starting substrate by etching. As a result, the substrate 10 of the configuration shown in FIGS. 4A and 4B is provided. On the surface of the movable electrode plate 20 there are formed the mirrors 41, 42, 41' and 42'.

Now, a description will be given, with reference to FIGS. 5A to 5F and 6A to 6E, of the steps involved in the formation of the movable electrode plate 20 and the mirrors 41, 42, 41' and 42'.

Step 1 (FIG. 5A): Prepare the starting silicon substrate 10.

Step 2 (FIG. 5B): Form a poly-silicon film all over the surface of the silicon substrate 10, and pattern the film into shapes of the flexure portions 21, the coupling portions 22 and the movable electrode plate 20.

Step 3 (FIG. 5C): Cover the substrate 10 all over the top and bottom surfaces thereof with a silicon dioxide ($SiO_2$) film 17, and remove the film 17 on the underside of the substrate 10 over an area where to form the rectangular through hole 12.

Step 4 (FIG. 5D): Selectively etch away the underside of the substrate 10 to form the through hole 12.

Step 5 (FIG. 5E): Pattern the silicon dioxide film 17 on the top surface of the substrate 10 into shapes necessary for forming the two lens receiving recesses 13 and the two V grooves 14 and 14' extending thereform in parallel relation.

Step 6 (FIG. 5F): Etch away the selected surface areas of the substrate 10 to form the lens receiving recesses 13 and the V grooves 14 and 14'.

Step 7 (FIG. 6A): Remove the silicon dioxide film 17 remaining after Step 6.

Step 8 (FIG. 6B): Coat the entire surface area of the substrate 10 with a tens-of-micrometers-thick layer of photosensitive synthetic resin E.

Step 9 (FIG. 6C): Expose those vertically hatched areas of the photosensitive synthetic resin layer where to form the mirrors 41, 42, 41' and 42' to light L from above to form mirror bodies m.

Step 10 (FIG. 6D): Remove unexposed areas of the photosensitive synthetic resin layer E by development, leaving the mirror bodies m.

Step 11 (FIG. 6E): Coat the mirror bodies m with metal to form the mirrors 41, 42, 41' and 42' that are hundreds of micrometers in height.

Figure 7A:
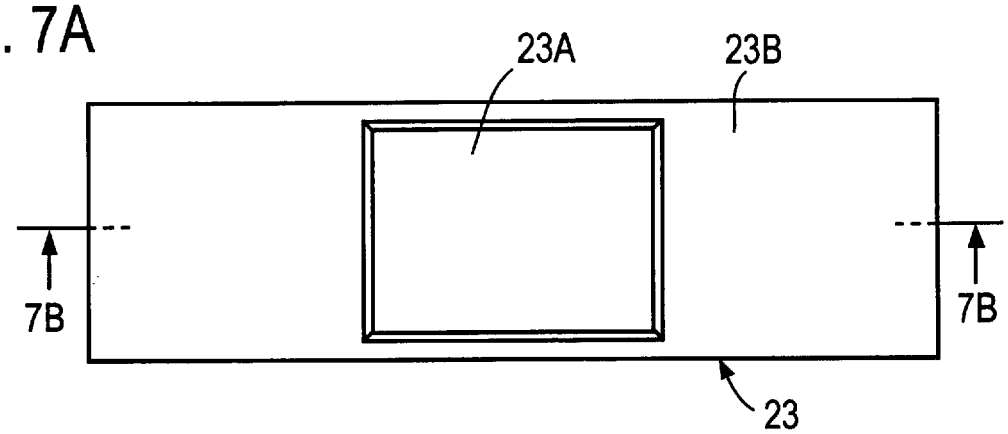
FIG. 7A is a plan view for explaining a stationary electrode plate.
Figure 7B:
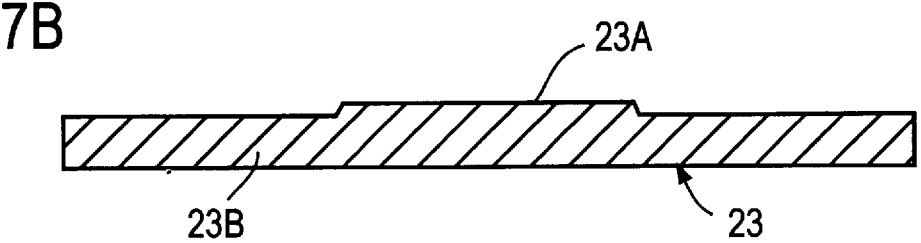
FIG. 7B is a sectional view taken along the line 7B—7B in FIG. 7A.

FIGS. 7A and 7B depict a stationary electrode plate, which is indicated generally by 23. The stationary electrode plate 23 is has a rectangular central raised portion 23A and a peripheral flange portion 23B surrounding it which are formed by etching away the marginal portion of a starting semiconductor substrate, the stationary electrode plate 23 being deposited over the entire area of its top surface with a silicon dioxide film. The shape and size of the central raised portion are selected such that it is fitted into the through hole 12 from the underside with the peripheral flange portion fixed to the underside of the substrate 10.

Figure 8A:
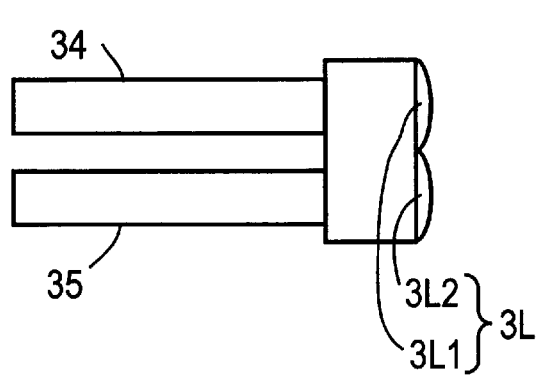
FIG. 8A is a diagram for explaining a microlens array attached to output and input optical fibers 34 and 35.
Figure 8B:
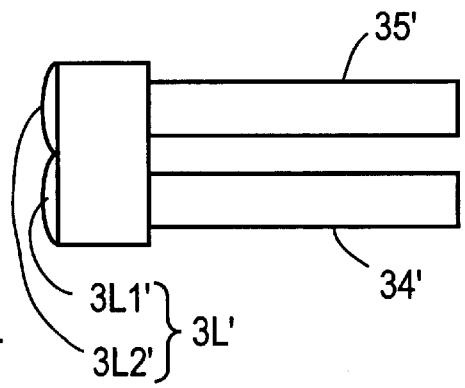
FIG. 8B is a diagram for explaining a microlens array attached to output and input optical fibers 34' and 35'.
Figure 10A:
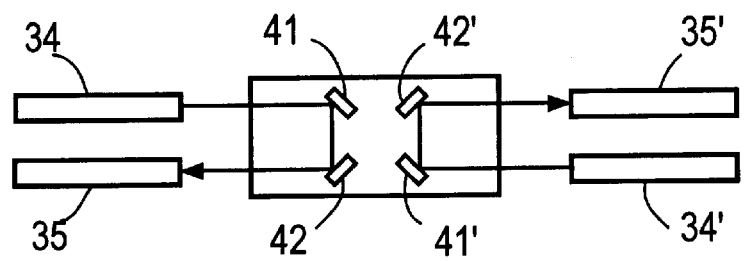
FIG. 10A is a diagram for explaining the operation of a 2-by-2 optical switch when mirrors are held in optical paths of incident light beams.
Figure 10B:
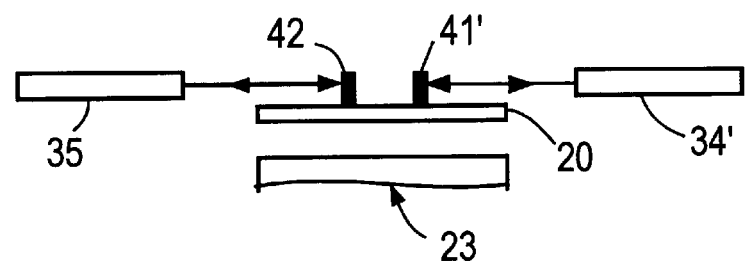
FIG. 10B is a side view of FIG. 10A.
Figure 10C:
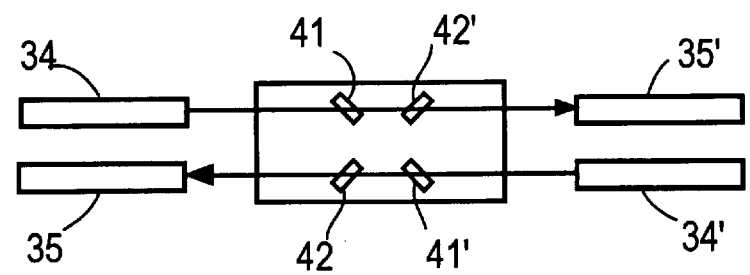
FIG. 10C is a diagram for explaining the operation of the optical switch when the mirror are held out of the optical paths of the incident light beams.
Figure 10D:
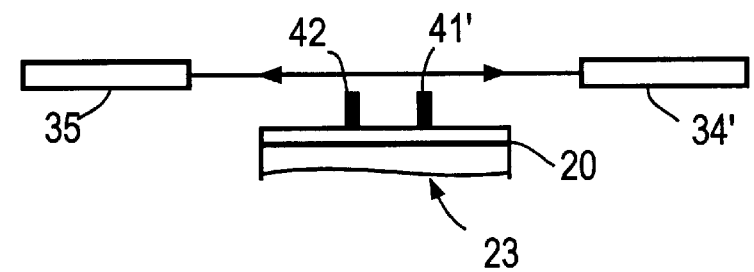
FIG. 10D is a side view of FIG. 10C.
Figure 11A:
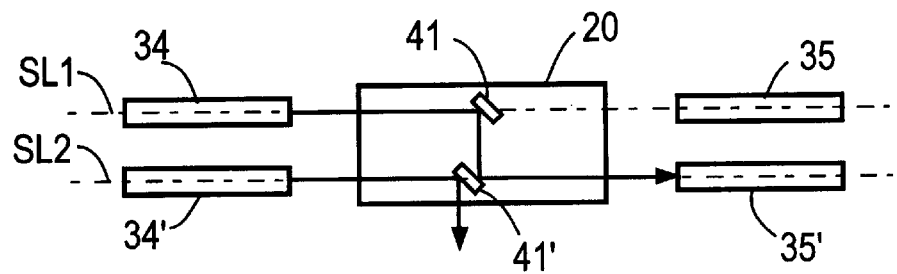
FIG. 11A is a diagram for explaining the operation of another embodiment of the 2-by-2 optical switch when the mirrors are held in the optical path of the incident light beams.
Figure 11B:
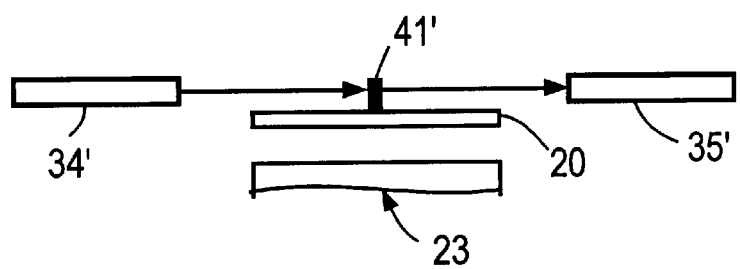
FIG. 11B is a side view of FIG. 11A.
Figure 11C:
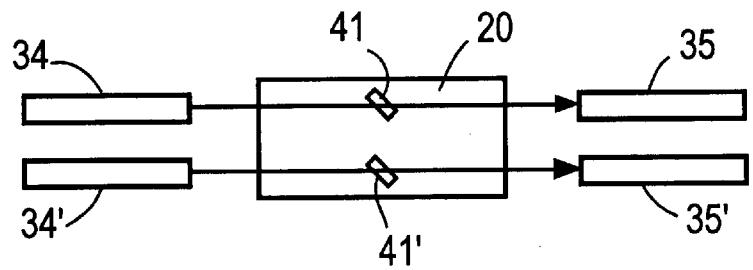
FIG. 11C is a diagram for explaining the operation of the optical switch when the mirror are held out of the optical paths of the incident light beams.
Figure 11D:
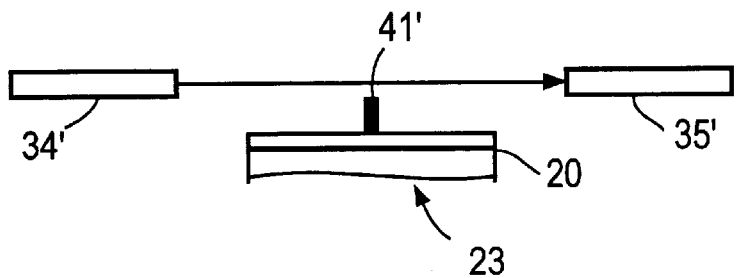
FIG. 11D is a side view of FIG. 11C.
Figure 12A:
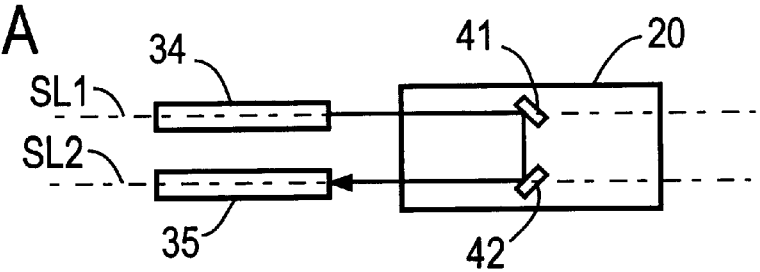
FIG. 12A is a diagram for explaining the operation of an embodiment of a 1-by-1 optical switch when mirrors are held in the optical path of an incident light beam.
Figure 12B:
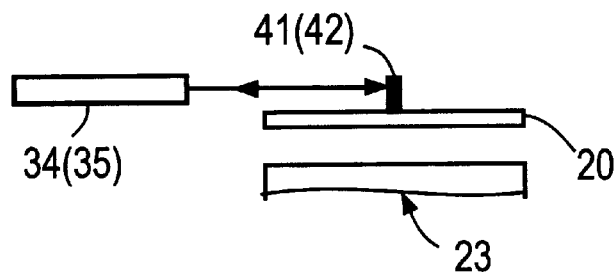
FIG. 12B is a side view of FIG. 12A.
Figure 12C:
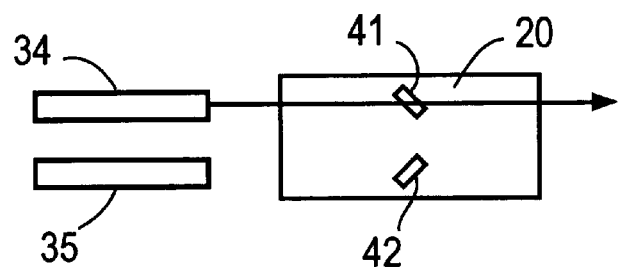
FIG. 12C is a diagram for explaining the operation of the 1-by-1 optical switch when mirrors are held out of the optical path of the incident light beam.
Figure 12D:
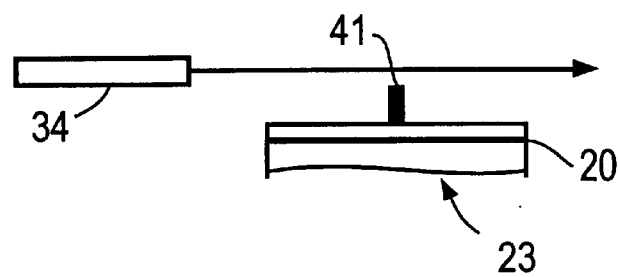
FIG. 12D is a side view of FIG. 12C.
Figure 13A:
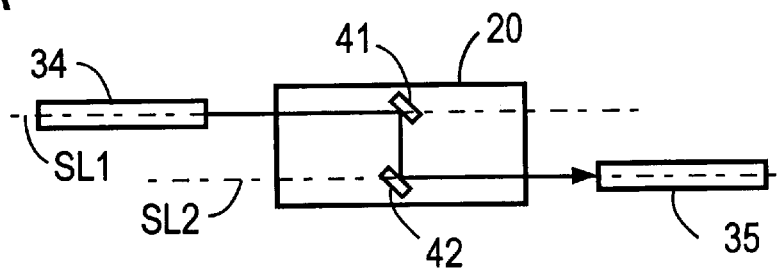
FIG. 13A is a diagram for explaining the operation of another embodiment of the 1-by-1 optical switch when mirrors are held in the optical path of the incident light beam.
Figure 13B:
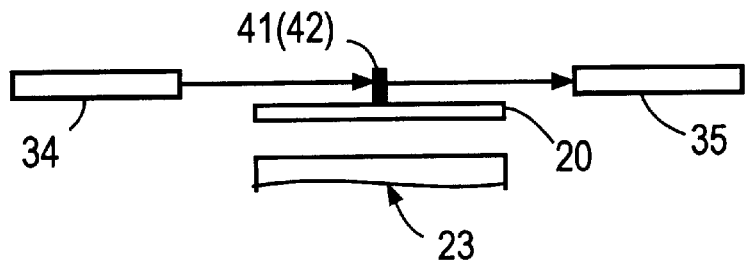
FIG. 13B is a side view of FIG. 13A.
Figure 13C:
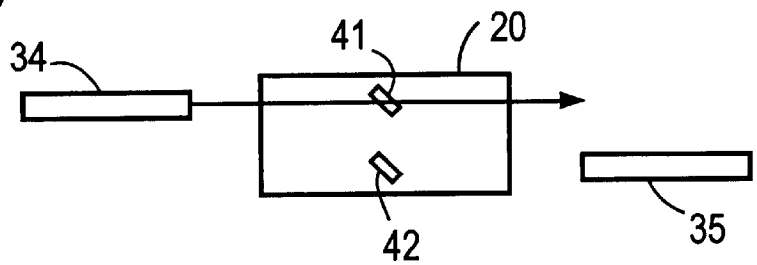
FIG. 13C is a diagram for explaining the operation of the 1-by-1 optical switch when mirrors are held out of the optical path of the incident light beam.
Figure 13D:
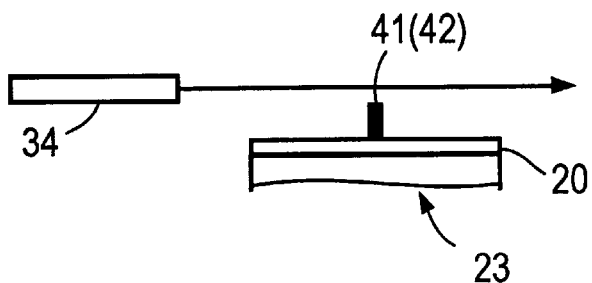
FIG. 13D is a side view of FIG. 13C.

FIGS. 8A and 8B show optical fibers and microlens arrays attached thereto. Microlenses 3L1 and 3L2, which constitute a microlens array 3L, are obtained by cutting out two adjacent microlenses from a flat microlens array formed by a number of lenses arranged in matrix form on a transparent sheet of glass. The microlens 3L1 of the microlens array 3L is attached to a light-emitting end face of the output optical fiber 34, whereas the microlens 3L2 is attached to a light-receiving end face of the input optical fiber 35. Similarly, a microlens 3L1' of a microlens array 3L' is attached to a light-emitting end face of the output optical fiber 34' and a microlens 3L2' is attached to a light-receiving end face of the input optical fiber 35'.

FIGS. 9A and 9B schematically illustrate the 2-by-2 optical switch fabricated as described above. The 2-by-2 optical switch of this embodiment comprises: four optical fibers, which are the output optical fibers 34, 34' and the input optical fibers 35, 35'; the four microlenses 3L1, 3L2 and 3L1', 3L2' attached to the four optical fibers 34, 35 and 34', 35', respectively; the movable electrode plate 20; the mirrors 41, 42, 41' and 42' formed on the movable electrode plate 20; and the stationary electrode plate 23 fixed to the substrate 10. Along the one SL1 of two parallel straight lines SL1 and SL2 there are aligned the output optical fiber 34 and the input optical fiber 35' with their opposed end faces spaced apart, and along the other straight line SL2 there are aligned the output optical fiber 34' and the input optical fiber 35 with their opposed end faces spaced apart.

The mirrors formed upright on the movable electrode plate 20 are interposed between the output optical fiber 34 and the input optical fiber 35' and between the output optical fiber 34' and the input optical fiber 35 in opposing relation to their inner end faces. The mirrors 41 and 42' are disposed with their reflecting surfaces crossing the straight line SL1 and their extensions crossing each other at right angles, and the mirrors 41' and 42 are disposed with their reflecting surfaces crossing the straight line SL2 and their extensions crossing each other at right angles. Further, the condenser microlenses 3L1, 3L1' and 3L2, 3L2' are attached to the inner end faces of the output optical fibers 34, 34' and the input optical fibers 35, 35', respectively.

Turning next to FIGS. 10A to 10D, the switching operation of the 2-by-2 optical switch will be described below. In the steady state of the 2-by-2 optical switch shown in FIGS. 10A and 10B, the light beam emitted from the output optical fiber 34 is reflected by the mirrors 41 and 42 and hence is incident on the input optical fiber 35, but the emitted light beam is not incident on the other input optical fiber 35' since it is intercepted by the mirror 41. On the other hand, the light beam emitted from the output optical fiber 34' is reflected by the mirrors 41' and 42' for incidence on the input optical fiber 35', but the emitted light beam is not incident on the input optical fiber 35 since it is intercepted by the mirror 41'. In the drive state shown in FIGS. 10C and 10D in which the movable electrode plate 20 is attracted downward by voltage application across the movable and stationary electrode plates 20 and 23, the light beam emitted from the output optical fiber 34 travels in a straight line over the mirrors 41 and 42' and impinges on the input optical fiber 35' but it does not strike on the input optical fiber 35. On the other hand, the light beam emitted from the output optical fiber 34' travels in a straight line over the mirrors 41' and 42 and impinges on the input optical fiber 35 but it does not strike on the input optical fiber 35'.

FIGS. 11A to 11D illustrate another embodiment of the 2-by-2 optical switch according to the present invention. In this embodiment, the output optical fibers 34 and 34' are disposed in parallel along the two parallel straight lines SL1 and SL2, respectively, the input optical fibers 35 and 35' are similarly disposed along the lines SL1 and SL2 in longitudinally spaced relation to the output optical fibers 34 and 34', respectively, and the mirrors 41 and 41' formed on the movable electrode plate 20 are interposed between the output and input optical fibers 34, 34' and 35, 35'. In the steady state shown in FIGS. 11A and 11B, the light beam emitted from the output optical fiber 34 is reflected by the mirrors 41 and 41' and incident on the input optical fiber 35', but the light beam emitted from the output optical fiber 34' is reflected by the mirror 41' and is not incident on either input optical fiber. In the driven state depicted in FIGS. 11C and 11D, the light beam emitted from the output optical fiber 34 is incident on the input optical fiber 35, and the light beam emitted from the output optical fiber 34' is also incident on the input optical fiber 35'. The 2-by-2 optical switch depicted in FIGS. 11A to 11D switches between the input optical fibers 35 and 35' for the light beam emitted from the output optical fiber 34 and performs ON-OFF control for the light beam emitted from the output optical fiber 34'.

FIGS. 12A to 12D illustrate an embodiment of a 1-by-1 optical switch according to the present invention, which is composed of two optical fibers, i.e. the output and input optical fibers 34 and 35, and the mirrors 41 and 42 formed on the movable electrode plate 20 in opposing relation to the optical fibers 34 and 35, respectively. The illustrated optical switch of such a construction can be used as an optical switch that performs an ON-OFF operation of the light beam for the input optical fiber 35. That is, the output and input optical fibers are arranged along the two parallel straight lines SL1 and SL2, respectively. In the steady state shown in FIGS. 12A and 12B, the light beam emitted from the output optical fiber 34 is incident on the input optical fiber 35 as shown. In the driven state depicted in FIGS. 12C and 12D, the light beam from the output optical fiber 34 is not incident on the input optical fiber 35.

Referring next to FIGS. 13A to 13D, another embodiment of the 1-by-1 optical switch will be described below. In this embodiment, too, the output and input optical fibers 34 and 35 are arranged along the two parallel straight lines SL1 and SL2, respectively. The mirrors 41 and 42 are formed on the movable electrode plate 20 in opposing relation to the output and input optical fibers 34 and 35, respectively. In the steady state shown in FIGS. 13A and 13B, the light beam emitted from the output optical fiber 34 is reflected by the mirrors 41 and 42 and incident on the input optical fiber 35. In the driven state shown in FIGS. 13C and 13D, the light beam from the output optical fiber 34 is not incident on the input optical fiber 35.

FIGS. 14A to 14D illustrate an embodiment of a 1-by-2 optical switch according to the present invention. In this embodiment, the output optical fiber 34 and the input optical fiber 35' are arranged along the straight line SL1 in longitudinally spaced relation, the input optical fiber 35 is arranged along the straight line SL2 in parallel relation to the output optical fiber 34, and the mirrors 41 and 42 are formed on the movable electrode plate 20 so that the former stands between the output and input optical fibers 34 and 35', whereas the latter stands opposite the end face of the input optical fiber 35. With this structure, the light beam emitted from the output optical fiber 34 can be switched between the two input optical fibers 35 and 35'. That is, in the steady state shown in FIGS. 14A and 14B, the light beam emitted from the output optical fiber 34 is reflected by the mirrors 41 and 42 to the input optical fiber 35. In the driven state shown in FIGS. 14C and 14D, the light beam from the output optical fiber 34 is incident on the input optical fiber 35'.

Figure 14A:
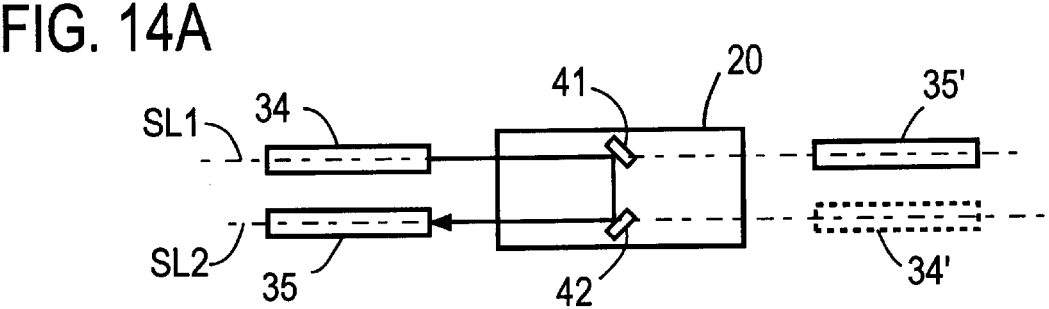
FIG. 14A is a diagram for explaining the operation of an embodiment of a 1-by-2 optical switch when mirrors are held in the optical path of an incident light beam.
Figure 14B:
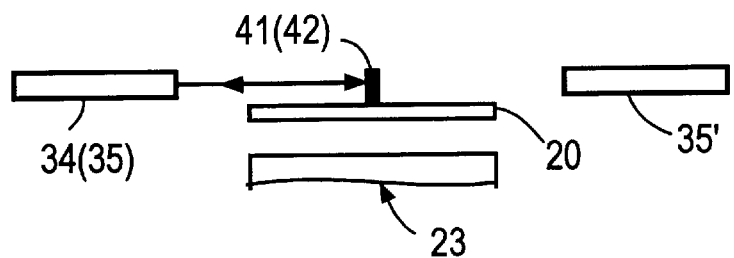
FIG. 14B is a side view of FIG. 14A.
Figure 14C:
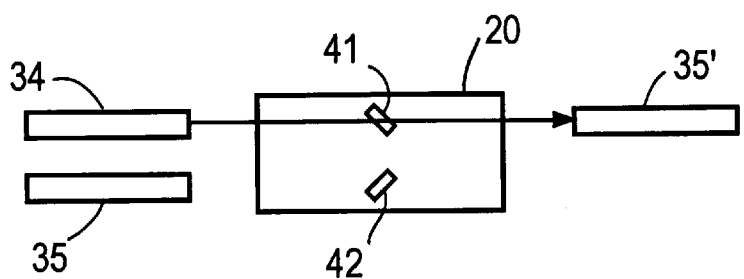
FIG. 14C is a diagram for explaining the operation of the 1-by-2 optical switch when mirrors are held out of the optical path of the incident light beam.
Figure 14D:
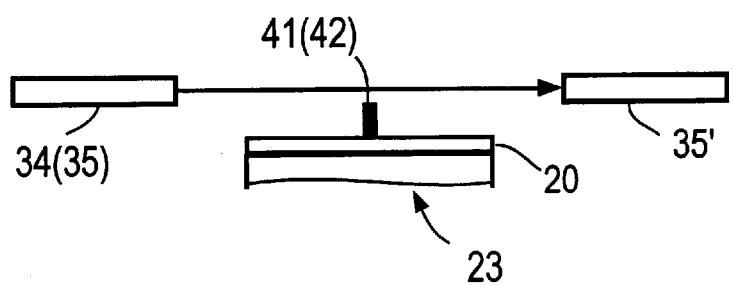
FIG. 14D is a side view of FIG. 14C.

The embodiment of FIGS. 14A to 14D may be modified into a 2-by-2 optical switch in which the output optical fiber 34' is further arranged along the straight line SL2 in parallel relation to the input optical fiber 35' as indicated by the broken lines in FIG. 14A so that the light beam emitted from the output optical fiber 34' is incident on the input optical fiber 35 when the movable electrode plate 20 is displaced toward the stationary electrode plate 23 by voltage application across them.

FIGS. 15A to 15D illustrate another embodiment of the 1-by-2 optical switch according to the present invention. In this embodiment, the output optical fiber 34 and the input optical fiber 35' are arranged along the straight line SL1 in longitudinally spaced relation, the input optical fiber 35 is arranged along the straight line SL2 in parallel relation to the output optical fiber 35', and the mirrors 41 and 42 are formed on the movable electrode plate 20 so that the former stands between the output and input optical fibers 34 and 35', whereas the latter stands opposite the end face of the input optical fiber 35. With this structure, the light beam emitted from the output optical fiber 34 can be switched between the two input optical fibers 35 and 35'. That is, in the steady state shown in FIGS. 15A and 15B, the light beam emitted from the output optical fiber 34 is reflected by the mirrors 41 and 42 to the input optical fiber 35. In the driven state shown in FIGS. 15C and 15D, the light beam from the output optical fiber 34 is incident on the input optical fiber 35'.

Figure 15A:
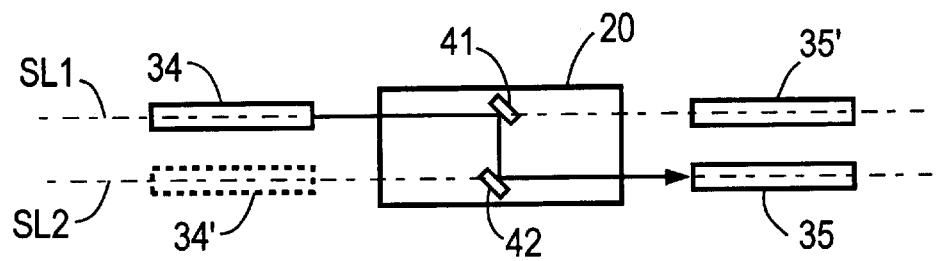
FIG. 15A is a diagram for explaining the operation of another embodiment of the 1-by-2 optical switch when mirrors are held in the optical path of an incident light beam.
Figure 15B:
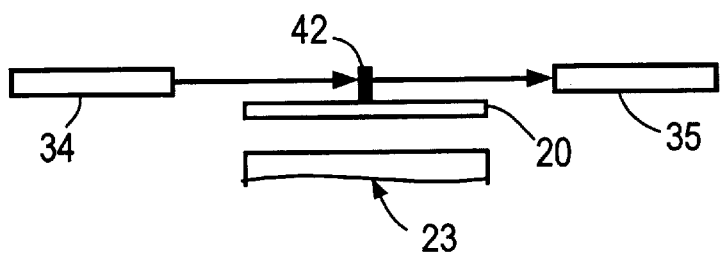
FIG. 15B is a side view of FIG. 15A.
Figure 15C:
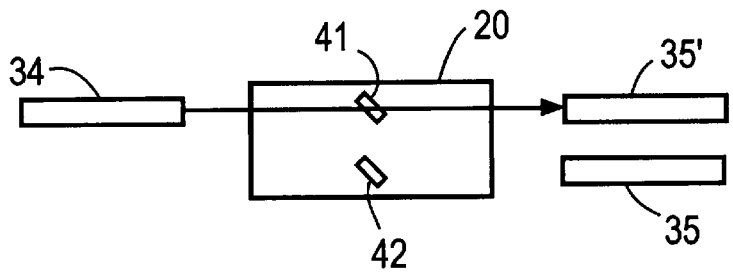
FIG. 15C is a diagram for explaining the operation of the 1-by-2 optical switch when mirrors are held out of the optical path of the incident light beam.
Figure 15D:
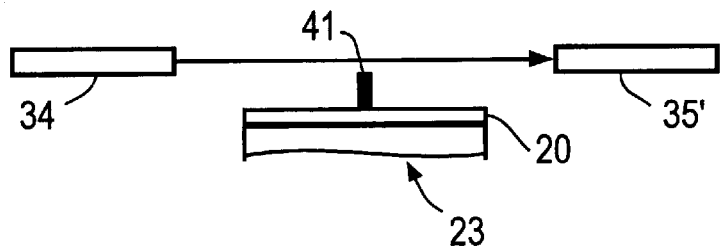
FIG. 15D is a side view of FIG. 15C.

The embodiment of FIGS. 15A to 15D may be modified into a 2-by-2 optical switch in which the output optical fiber 34' is further arranged along the straight line SL2 in parallel relation to the output optical fiber 35' as indicated by the broken lines in FIG. 15A so that the light beam emitted from the output optical fiber 34' is incident on the input optical fiber 35 when the movable electrode plate 20 is displaced toward the stationary electrode plate 23 by voltage application across them.

Figure 16A:
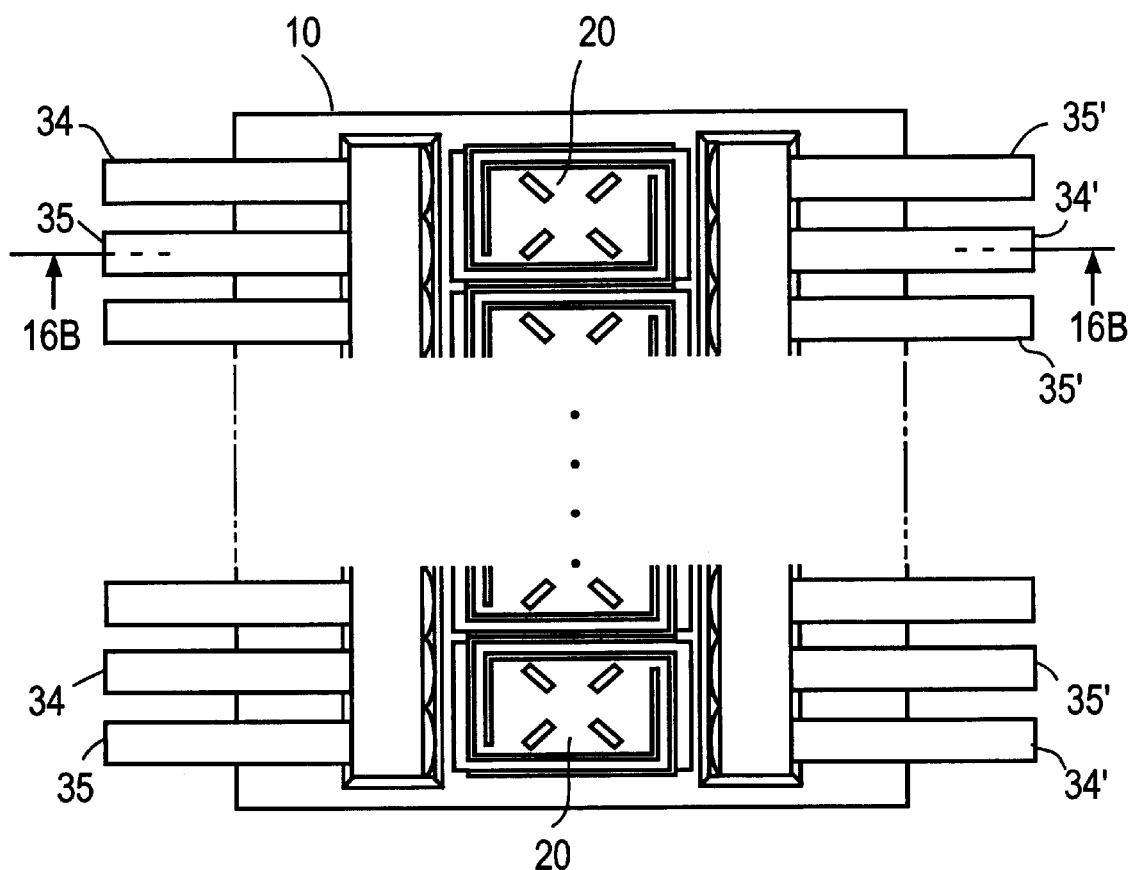
FIG. 16A is a plan view illustrating an optical switch array.
Figure 16B:
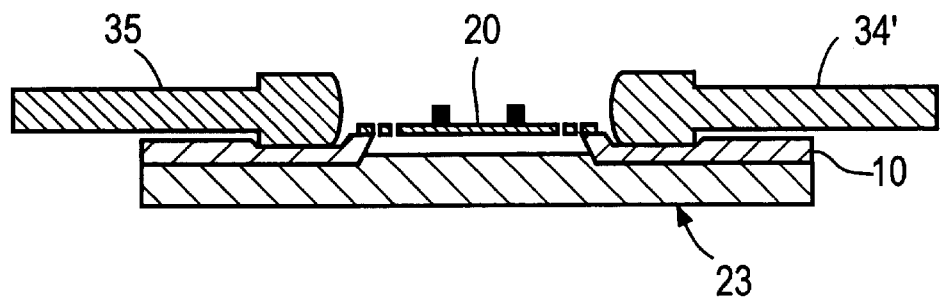
FIG. 16B is a sectional view taken along the line 16B—16B in FIG. 16A.

FIGS. 16A and 16B illustrate an optical switch array in which plural 2-by-2 optical switches, depicted in FIGS. 10A to 10D, are arranged side by side. That is, since each 2-by-2 optical switch has four optical fibers arranged along the two parallel straight lines, the side-by-side arrangement of such 2-by-2 optical switches provides an optical switch array with no output and input optical fibers crossing each other.

It is also possible to construct an optical switch array wherein plural sets of optical fibers and mirrors in each of the embodiments of FIGS. 10 to 15 are formed on the substrate 10 and the movable electrode plate 20, respectively, as shown in FIG. 16.

EFFECT OF THE INVENTION

Figure 17A:
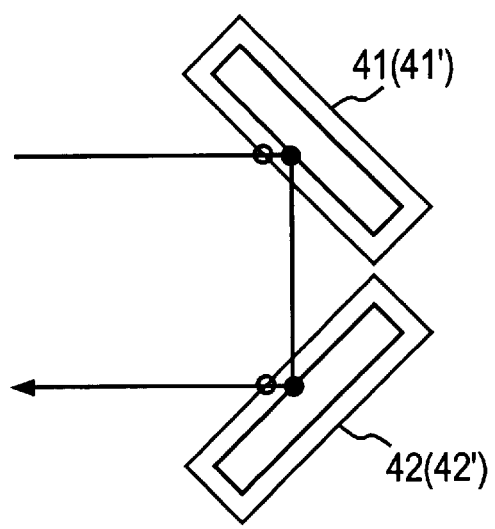
FIG. 17A is a diagram for explaining the reflection of light by mirrors of different thicknesses.
Figure 17B:
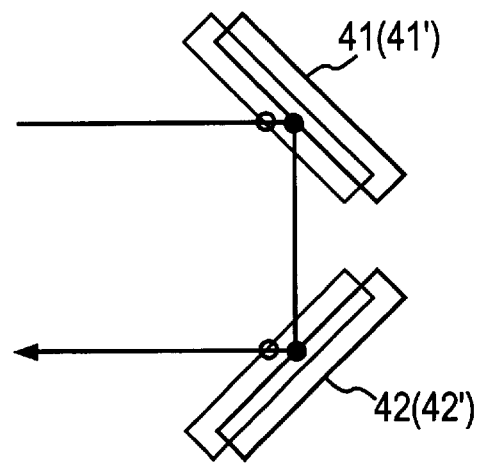
FIG. 17B is a diagram for explaining the reflection of light by mirrors displaced in position.
Figure 17C:
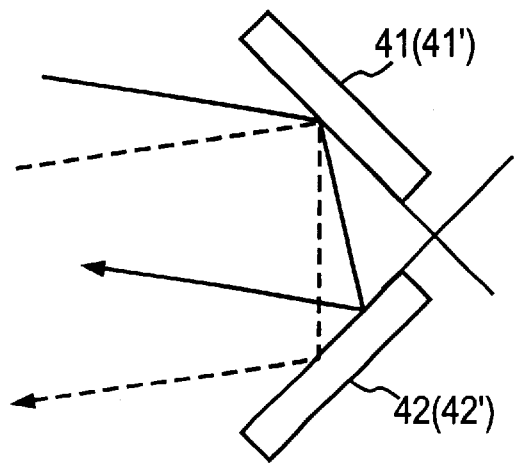
FIG. 17C is a diagram for explaining the reflection of light by mirrors displaced in angle.

In the prior art examples, the thickness of the mirror, the accuracy of its position on the movable electrode plate and the accuracy of the angle of the mirror surface all exert influence on the axis alignment of the reflected light, degrading the performance of the optical switch. According to the present invention, the paired two mirrors 41 (41') and 42 (42') cross each other at right angles as depicted in FIGS. 17A to 17C, and consequently, even if the two mirrors are displaced the same distance toward the optical axis of the incident light, the optical axis of the reflected light will not be displaced. Further, the incident light and the reflected light beams become parallel independently of the angle of the incident light. This somewhat raises the limitations on the formation of the mirrors, making it possible to construct high-performance optical switches.

Thus, according to the present invention, the output and input optical fibers are arranged along the two straight lines in longitudinally space relation and, and the emitted light beam is reflected to the input optical fiber by even mirrors disposed with their reflected surfaces crossing at right angles or parallel to each other; hence, the optical switch of the present invention is free from the problem of displacement of the optical axis of the reflected light by the thickness of each mirror. Moreover, since the optical fibers are arranged in parallel with each other, plural sets of optical switches that are simultaneously driven can be formed on the same substrate.

What is claimed is:

1. An optical switch comprising:

a substrate;

a stationary electrode plate provided on said substrate in parallel relation thereto;

a movable electrode plate mounted on said substrate through flexure portions and in space parallel relation to said stationary electrode plate so that said movable electrode plate moves toward or away from said stationary electrode plate;

a first optical fiber having an optical axis on a first straight line passing across said movable electrode plate in parallel relation to said substrate and having its first light beam emitting tip end portion fixed to said substrate;

a second optical fiber having an optical axis on a second straight line passing across said movable electrode plate in parallel relation to said first straight line and having its tip end portion fixed to said substrate;

a first mirror formed on said movable electrode plate, for reflecting said first light beam emitted from said first optical fiber to a direction across said second straight line; and a second mirror formed on said movable electrode plate, for reflecting said reflected light beam from said first mirror as a second light beam along said second straight line for incidence on the end face of said tip end portion of said second optical fiber fixed to said substrate;

wherein said movable electrode plate moves toward or away from said stationary electrode plate in response to the application of a voltage across said movable electrode plate and said stationary electrode plate or removal of said voltage from between said movable and stationary electrode plates by which said first and second mirrors are brought out of or into the paths of said first light beam and said reflected light beam from said first mirror.

2. The optical switch of claim 1, which further comprises a third optical fiber arranged on an extension of said first light beam across said first mirror and having its tip end portion fixed to said substrate in opposing relation to the back of said first mirror, and wherein said first light beam is incident on said tip of said third optical fiber when said first mirror is out of the path of said first light beam.

3. The optical switch of claim 1, which further comprises a third optical fiber having an optical axis on said second straight line on the side opposite to said second optical fiber with respect to said first mirror and having its tip end portion fixed to said substrate in opposing relation to the back of said second mirror, and wherein said third optical fiber emits a third light beam, said third light beam being incident on the tip end portion of said second optical fiber when said second mirror is out of the path of said reflected light beam.

4. The optical switch of claim 2, which further comprises a fourth optical fiber having its tip end portion fixed to said substrate on a straight line parallel to said first light beam on the side opposite to said optical fiber with respect to said second mirror, for emitting a third light beam toward the tip end portion of said second optical fiber.

5. The optical switch of claim 4, wherein said second mirror is disposed with its reflecting surface crossing the reflecting surface of said first mirror at right angles, and which further comprises: a third mirror disposed between said second mirror and the tip end portion of said fourth optical fiber, for reflecting a third light beam incident thereon from said fourth optical fiber to a direction across said first straight line between said first mirror and the tip end portion of said third optical fiber; and a fourth mirror disposed between said first mirror and the tip end portion of said third optical fiber, for reflecting said reflected light beam from said third mirror for incidence on the tip end portion of said third optical fiber.

6. The optical switch of any one of claims 1 to 4, wherein said second mirror is disposed with its reflecting surface held in parallel to the reflecting surface of said first mirror.

7. The optical switch of any one of claims 1 to 4, wherein said second mirror is disposed with its reflecting surface crossing the reflecting surface of said first mirror at right angles.

8. The optical switch of claim 1, wherein a plurality of sets of said first and second optical fibers and a plurality of sets of said first and second mirrors are provided side by side on said substrate and said movable electrode plate, respectively.

9. The optical switch of claim 2 or 3, wherein a plurality of sets of said first, second and third optical fibers and a plurality of sets of said first and second mirrors are provided side by side on said substrate and said movable electrode plate, respectively.

10. The optical switch of claim 4, wherein a plurality of sets of said first to fourth optical fibers and a plurality of sets of said first and second mirrors are provided side by side on said substrate and said movable electrode plate, respectively.

11. The optical switch of claim 5, wherein a plurality of sets of said first to fourth optical fibers and a plurality of sets of said first to fourth mirrors are provided side by side on said substrate and said movable electrode plate, respectively.

12. The optical switch of any one of claims 1 to 5, wherein:
   said substrate has a through hole centrally thereof; said movable electrode plate is disposed inside said through hole on the side of the top surface of said substrate;
   and said stationary electrode plate is disposed on the underside of said substrate to cover said through hole.

13. The optical switch of claim 12, which further comprises a condenser lens attached to the tip end portion of each of said optical fibers.

14. The optical switch of claim 13, wherein said substrate has in its top surface recesses for receiving the tip end portions of said optical fibers and said condenser lenses on both sides of said through hole and V grooves extending from said recesses to opposite ends of said substrate in parallel to said first and second straight lines, said optical fibers being positioned by and fixed in said V grooves, respectively.

* * * * *